United States Patent
Schauer, Jr.

[15] 3,686,476
[45] Aug. 22, 1972

[54] OVEN WITH TEMPERATURE LIMITING PROTECTION AND INDICATING SYSTEM

[72] Inventor: George W. Schauer, Jr., Dayton, Ohio

[73] Assignee: General Motors Corporation, Detroit, Mich.

[22] Filed: Aug. 5, 1971

[21] Appl. No.: 169,295

Related U.S. Application Data

[63] Continuation-in-part of Ser. No. 56,485, July 20, 1970, Pat. No. 3,619,564.

[52] U.S. Cl. ............219/413, 219/393, 219/398
[51] Int. Cl. ............................................F27d 11/02
[58] Field of Search......219/393, 396, 398, 412, 413, 219/510; 126/374

[56] References Cited

UNITED STATES PATENTS

| | | |
|---|---|---|
| 3,327,094 | 6/1967 | Martin et al............219/393 |
| 3,350,042 | 10/1967 | Getman...................219/412 |
| 3,353,004 | 11/1967 | Alexander................219/398 |
| 3,484,858 | 12/1969 | Jordan et al..............219/413 |
| 3,619,564 | 11/1967 | Schauer, Jr...............219/413 |

*Primary Examiner*—Volodymyr Y. Mayewsky
*Attorney*—William S. Pettigrew et al.

[57] ABSTRACT

A self-cleaning oven having a high limit thermostat which protects against an over-temperature condition inside the oven and a cooling fan failure outside the oven and having an oven control clock motor in series with said thermostat so that the user can see on the oven clock how long the oven has been cut off.

3 Claims, 4 Drawing Figures

Patented Aug. 22, 1972
3,686,476
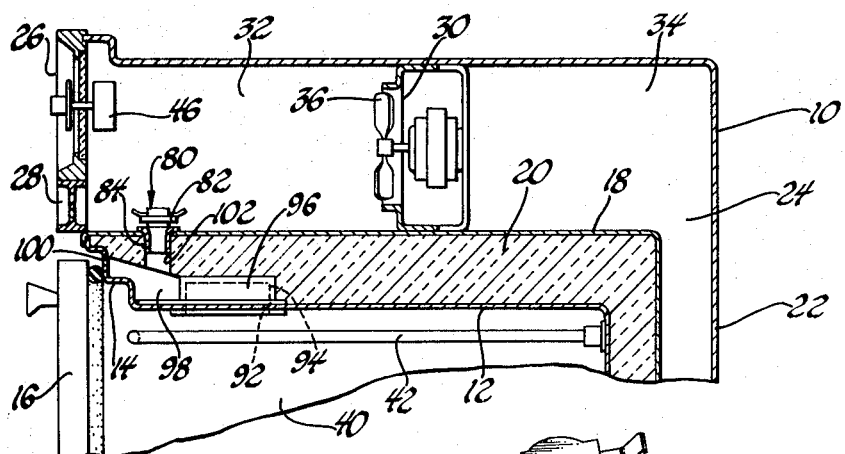
Fig. 1
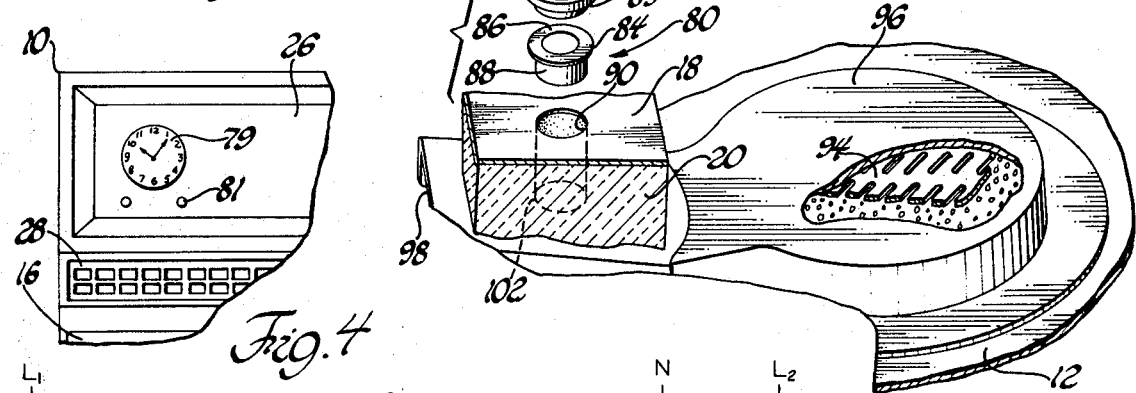
Fig. 4
Fig. 2
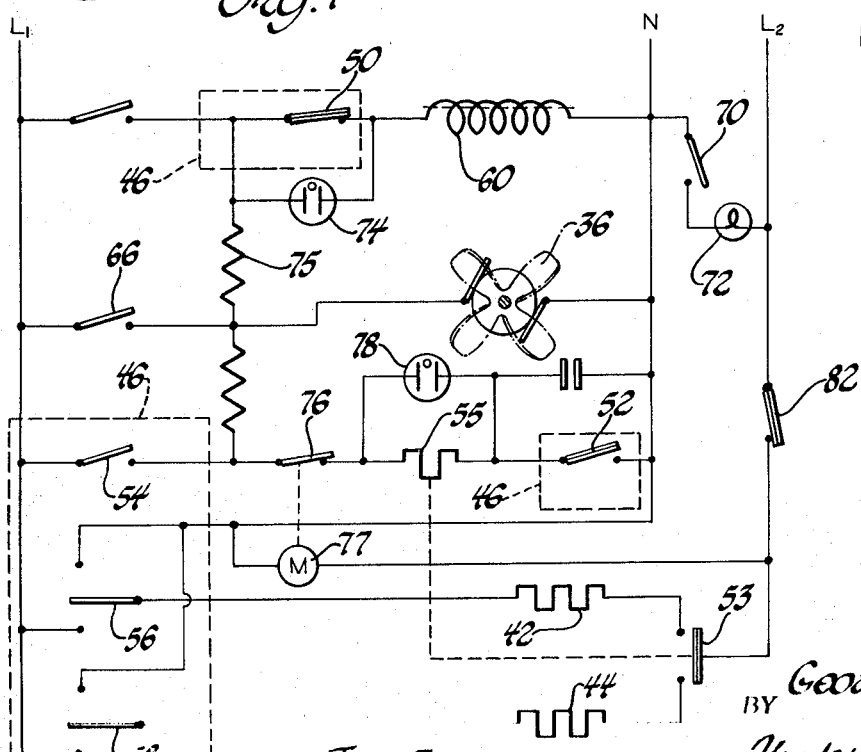
Fig. 3
INVENTOR.
George W. Schauer, Jr.
BY Frederick M. Ritchie
ATTORNEY

OVEN WITH TEMPERATURE LIMITING PROTECTION AND INDICATING SYSTEM

This is a Continuation-In-Part of my application Ser. No. 56,485, filed July 20, 1970, now Pat. No. 3,619,564, allowed May 20, 1971.

Prior art self-cleaning ovens provide temperature limiting protection which operate upon failure of the primary oven temperature control systems, e.g., either the cooling fan system or oven thermostat system. Such protection, for example, is part of the self-cleaning oven model RBE–94N manufactured by the Frigidaire Division of General Motors. This prior art oven includes both a fan safety thermostat and an oven safety thermostat.

The oven safety thermostat is a single pole, manual reset type switch with a liquid filled capillary line and bulb assembly. The capillary line and bulb assembly are stainless steel. The bulb section is clamped to the oven liner at the top right corner. The switch is calibrated to toggle open at 1015° F. ± 15° and remain open until the reset button is pushed to manually reset the switch.

The fan safety thermostat is a bimetal disc type. It is calibrated to open during temperature rise at 185° F. ± 6° F., and then re-close on temperature decrease at 145° F. ± 9° F. The thermostat and its disc portion is flush mounted to the insulation retainer panel behind the control panel. The thermostat is a safety device which opens the electrical circuit to the thermal relay for the oven in the event an over-temperature situation occurs, stopping the bake and broil elements from heating. The most probable cause of an open fan safety thermostat is an inoperative blower fan.

This invention is directed to a temperature limiting protection system which combines into one thermostat the protective functions of both the fan safety thermostat and the oven safety thermostat.

It is, therefore, a general object of my invention to provide a simplified and improved temperature protection system for a self-cleaning oven.

A more specific object of this invention is the provision of a single thermostat positioned with respect to the air cooling system and the oven heating system in a manner to sense failure of either system and, through an oven clock timing system, to indicate when the failure was sensed and for how long.

Another specific object of this invention is the provision of a single thermostat for protecting against failure of the oven cooling system and the oven heating system wherein the thermostat is positioned on a heat sensing ferrule to sense excessive temperature in the oven vent and in exposed air-cooled relation to the exhaust air of the cooling system to sense fan failure.

Further objects and advantages of the present invention will be apparent from the following description, reference being had to the accompanying drawings wherein a preferred embodiment of the present invention is clearly shown.

In the drawings:

FIG. 1 is a fragmentary side sectional view of a self-cleaning oven provided with this invention;

FIG. 2 is an exploded view of the temperature sensing components of this invention;

FIG. 3 is a schematic wiring diagram illustrating the operation of this invention; and FIG. 4 is a fragmentary front elevational view of an oven control panel having a clock for indicating the time of day and for timing oven cooking operations.

In accordance with this invention and with reference to FIG. 1, a built-in wall oven 10 is illustrated. The wall oven includes a box-like oven liner 12 having a front opening 14 closed by an access door 16. The oven liner 12 is surrounded by an inner oven cabinet or insulation retainer 18 and spaced therefrom by fiber glass insulation 20. An outer oven cabinet 22 surrounds the insulated oven liner and is spaced from the inner oven cabinet 18 to form a cooling air passageway 24. The air passageway terminates at the front of the oven in a control panel 26 which includes an air outlet grille 28 overlying the oven access door 16.

A cooling air system is provided to envelop the insulated oven liner with a cooling air flow. For this purpose the air passageway 24 includes a transverse partition 30 which divides the air passageway 24 into a positive pressure plenum chamber 32 and a negative pressure chamber 34. A blower means or motor-driven fan 36 is positioned in an opening of the transverse partition 30 and is operable to pull cooling air around the sides of the insulated oven liner and up the back thereof to the negative pressure chamber 34 from whence the cooling air is forced into the plenum chamber 32 and out of the air outlet 28.

The self-cleaning oven includes heating means within the oven liner for heating the oven cavity 40. The heating means includes a broil heating element 42 at the top of the oven liner and a bake heating element 44 (not shown) at the bottom. An oven temperature control assembly or oven thermostat means 46 is positioned on the control panel 26 and operates to control the heating means for providing in the oven cavity either a cooking temperature between 150° F. and 550° F. or a pyrolytic cleaning temperature of about 900° F.

With reference to the schematic wiring diagram in FIG. 3, the oven temperature control assembly or oven thermostat 46 includes those elements included within the phantom line boxes. The assembly consists of a bakelite switching case and a helium gas-filled capillary, bulb and bourden tube (not shown). The assembly also has an internal cam to correlate the operation of three pairs of single pole, single throw contacts 50, 52 and 54 and two pairs of single pole double throw contacts 56, 58. One pair 52 of SPST contacts cycle open and closed depending on oven temperature, opening and closing in response thereto an oven temperature responsive switch means 53 in series electrical supply relationship with said heating means 42, 44. The switch 53 is part of a thermal relay including a heater 55 and, of course, could be used to control a gas valve where the power supply for the oven heating means is gas. When contacts 52 are closed, the oven elements 42, 44 are heating; when opened, these elements are not heating. Another pair 50 of SPST contacts are closed below an oven temperature of 560° F. and opened above an oven temperature of 560 F. When this switch is opened, a lock solenoid 60 is inoperable so that the access door 16 cannot be opened during a pyrolytic self-cleaning operation. The contacts 54 are essentially line switch contacts to the heater 55 of the thermal relay. Whenever contacts 54 are opened (such as at "OFF" setting), the thermal relay heater 55 cannot be energized to close the relay contacts 53; whenever contacts 54 are closed (such as "BAKE" or "BROIL" settings), the thermal relay heater can be energized depending upon whether the cycling contacts 52 are closed. At "-

CLEAN" setting, contacts 54 are open but the circuit to the thermal relay heater 55 is provided through the SPST interlock switch 66 which is closed when the door is closed and locked. The remaining contacts in the oven temperature thermostat are the SPDT contacts 56, 58 which circuit 118 volts or 236 volts to the heating elements 42, 44 depending on whether the oven temperature thermostat is set for "BAKE", "BROIL" or "CLEAN".

The circuit may also include a door switch 70 in series with an oven lamp 72 which is adapted to illuminate the oven cavity when the access door 16 is opened. A lock lamp 74, operating in conjunction with resistor 75, is adapted to illuminate when, during an oven cleaning cycle, the oven temperature exceeds 560° F. and the switch 50 opens. A conventional clock timer switch 76 is provided to time the oven cooking and cleaning operations. During such operations, an oven pilot light and capacitor circuit 78 indicates the cycling of heating elements 42, 44. The timer switch is operated by a clock motor 77 which also operates a clock 79 indicating the time of day. Knobs 81 are manually operable in a conventional manner to program the start and stop of an oven cooking operation.

In the prior art, multiple devices were provided to protect against over-temperature. In accordance with this invention, a single over-temperature protective means 80 guards against excessive temperature occasioned either by a faulty oven temperature control assembly 46 or a failure of the cooling air fan 36.

The over-temperature protective means 80 includes a temperature limiting thermostatic switch means 82 and a cylindrical aluminum sensing ferrule 84 for supporting the switch means. The switch means 82 is an exposed disc bimetal type thermostat adapted for surface mounting. It is calibrated to open at 243° F. ± 6° F. and close at 203° F. ± 10° F.

The sensing ferrule 84 is made of 0.032 aluminum and has a diameter of 0.88 inches across its upper annular flange 86, 9 diameter of 0.562 inches across its depending collar 88 and a height of 0.42 inches. The inner oven cabinet 18 has an opening 90 sized to receive the collar portion 88 of the sensing ferrule and the exposed bimetal disc portion 89 of the thermostatic switch means 82 is adapted to nest within the flange 86 of the ferrule, thereby closing the open upper end of the ferrule.

The oven cavity 40 is provided with a vent opening in the top wall of the oven liner at 92. A flow-through catalyst package 94 is positioned within the vent opening. It is housed on the outside of the oven liner 12 in a catalyst housing 96 which forms one part of a duct means placing the oven cavity 40 in communication with the atmosphere through the catalyst package 94. The other portion of the duct means is an oven vent 98 leading to an oven casing opening 100 in communication with the atmosphere between the access door 16 and the exhaust outlet opening 28. The catalyst package 94 is of a type presently sold by the Frigidaire Division of General Motors Corporation for use in the exhaust outlet of its current Self cleaning ovens. The catalyst package is filled with a bead type catalyst more fully described in U.S. Pat. No. 3,553,425, patented Jan. 5, 1971, and assigned to the same assignee as this application.

The housing for the thermostatic switch 82 is placed in the air stream of the cooling fan 36 over the aluminum sensing ferrule 84. A bore 102 through the insulation 20 forms a heat sensing chimney to receive the collar 88 of the ferrule. The chimney terminates at the oven vent duct 98. The heat pick-up from the vent duct 98 is determined by the proximity of the ferrule to the duct. It is not affected by the density of the insulation. The ferrule must be close enough to open switch 82 if the fan fails but not so close as to give false indications of overheating during normal cleaning cycles. If fan 36 fails, air flow across the housing for the thermostatic switch 82 ceases and the switch 82 overheats more quickly in response to heat in the chimney and opens one side of the power supply to deenergize the heating elements 42, 44. On the other hand if the oven temperature control assembly 46 fails in a heat ON condition, the heat exhausted from the over-temperature oven cavity through the oven vent duct 98 will build up excessive temperatures in the duct 98. This heat buildup will be sensed by the ferrule 84 and conducted to the thermostatic switch 82 which will open to deenergize the heating elements 42, 44. The heat buildup in this case is sufficient to cause switch 82 to open irrespective of the operation of fan 36.

The indicating portion of this invention is now called into play. When switch 82 opens in response to heat buildup, the clock motor 77 and thus the clock 79 stop. This is effected (FIG. 3) because clock motor 77 is energized from $L_2$ to N through the thermostatic switch 82. The user can see on the clock 79 when the oven was cut off by switch 82 and, with reference to the correct time of day, how long the oven has been off.

It should now be seen that an improved protective and indicating system has been provided wherein a single thermostatic means, because of its particular relationship to the oven clock, the oven vent and cooling fan, operates to protect against over-temperature conditions within the oven and to indicate when such condition occurred.

While the embodiments of the present invention as herein disclosed constitute preferred form, it is to be understood that other forms might be adopted.

I CLAIM:

1. In an oven comprising an oven liner and a front-opening access door forming an oven cooking cavity, an oven control panel having a time clock, a clock motor for operating said time clock, heating means for cooking food placed within the cavity as well as for pyrolytically removing food soil from the inner wall surfaces of the oven cavity, oven thermostat means including oven temperature responsive switch means in power supply relationship with said heating means for controlling said heating means below a predetermined temperature limit, an oven vent in an upper wall of the oven liner, means communicating with the oven vent for degrading the hot oven gases before they are returned to the atmosphere, duct means connected to said degrading means for discharging the degraded hot oven gases to the atmosphere, an inner oven cabinet surrounding the oven liner, insulation between said oven liner and said inner oven cabinet encompassing said duct means, an outer oven cabinet surrounding the inner oven cabinet but spaced therefrom to form an air passageway therebetween, a transverse partition in the air passageway to form a plenum chamber, fan means mounted through the partition and adapted to blow cooling air through said air passageway, and an air outlet opening from the plenum chamber, the invention comprising an over-temperature protective means protecting against failure of said fan means and said oven thermostat means and an indicating means for indicating said failure, said protective means including a temperature limiting thermostatic switch means and a sensing means, said sensing means supporting said temperature limiting thermostatic switch means and extending through said inner oven cabinet and said insulation toward said duct means to define with said insulation a heat sensing chimney which conveys heat to said sensing means from the degrated hot oven gases in said duct means as a measure of the temperature of said oven cavity, said temperature limiting thermostatic switch means including a single limit switch only in series electrical supply relationship with said oven temperature responsive switch means and having a first limit switch actuating portion in temperature sensing relation with said sensing means to sense an over-temperature condition in said oven cavity and a second limit switch actuating portion in heat transfer with the cooling air blown by said fan means to sense a failure condition of said fan means to blow cooling air through said air passageway, thereby to terminate heating in said oven cavity by interrupting power supply to said heating means upon occurrence of either of said conditions, and said indicating means including said time clock and said clock motor, said single limit switch in series electrical supply relationship with said clock motor, thereby to stop said time clock simultaneously with the interruption of power supply to said heating means.

2. In an oven comprising an oven liner and a front-opening access door forming an oven cooking cavity, an oven control panel having a time clock including a clock timer switch, a clock motor for operating said time clock and said clock timer switch, heating means operated by said clock timer switch for cooking food placed within the cavity in accordance with a timed program as well as for pyrolytically removing food soil from the inner wall surfaces of the oven cavity, oven thermostat means including oven temperature responsive switch means in power supply relationship with said heating means for controlling said heating means below a predetermined temperature limit, an oven vent in an upper wall of the oven liner, a catalytic oxidation unit communicating with the oven vent for degrading the hot oven gases before they are returned to the atmosphere, duct means connected to the oxidation unit for discharging the degraded hot oven gases to the atmosphere, an inner oven cabinet surrounding the oven liner, insulation between said oven liner and said inner oven cabinet encompassing said duct means, an outer oven cabinet surrounding the inner oven cabinet but spaced therefrom to form an air passageway therebetween, a transverse partition in the air passageway to form a plenum chamber, fan means mounted through the partition and adapted to blow cooling air through said air passageway, and an air outlet opening from the plenum chamber, the invention comprising an over-temperature protective means protecting against failure of said fan means and said oven thermostat means and an indicating means for indicating said failure, said protective means including a temperature limiting thermostatic switch means and a sensing ferrule, said ferrule supporting said temperature limiting thermostatic switch means and extending through said inner oven cabinet and said insulation toward said duct means to define with said insulation a heat sensing chimney which conveys heat to said ferrule from the degraded hot oven gases in said duct means as a measure of the temperature of said oven cavity, said temperature limiting thermostatic switch means including a single limit switch only in series electrical supply relationship with said oven temperature responsive switch means and having a first limit switch actuating portion in temperature sensing relation with said ferrule to sense an over-temperature condition in said oven cavity and a second limit switch actuating portion in heat transfer with the cooling air blown by said fan means to sense a failure condition of said fan means to blow cooling air through said air passageway, thereby to terminate heating in said oven cavity by interrupting power supply to said heating means upon occurrence of either of said conditions, and said indicating means including said time clock and said clock motor, said single limit switch in series electrical supply relationship with said clock motor, thereby to stop said time clock simultaneously with the interruption of power supply to said heating means.

3. In an oven comprising an oven liner and a front-opening access door forming an oven cooking cavity, an oven control panel having a time clock, a clock motor for operating said time clock, heating means for cooking food placed within the cavity, oven thermostat means including oven temperature responsive switch means in power supply relationship with said heating means for controlling said heating means below a predetermined temperature limit, an oven vent in an upper wall of the oven liner, duct means connected to said oven vent for discharging hot oven gases to the atmosphere, an inner oven cabinet surrounding the oven liner, insulation between said oven liner and said inner oven cabinet encompassing said duct means, an outer oven cabinet surrounding the inner oven cabinet but spaced therefrom to form an air passageway therebetween, a transverse partition in the air passageway to form a plenum chamber, fan means mounted through the partition and adapted to blow cooling air through said air passageway, and an air outlet opening from the plenum chamber, the invention comprising an over-temperature protective means protecting against failure of said fan means and said oven thermostat means and an indicating means for indicating said failure, said protective means including a temperature limiting thermostatic switch means and means for sensing the heat of said oven gases, said sensing means supporting said temperature limiting thermostatic switch means and extending through said inner oven cabinet and said insulation into heat sensing relation with the oven gases in said duct means as a measure of the temperature of said oven cavity, said temperature limiting thermostatic switch means including a single limit switch only in series electrical supply relationship with said oven temperature responsive switch means and having a first limit switch actuating portion in temperature sensing relation with said sensing means to sense an over-temperature condition in said oven cavity and a second limit switch actuating portion in heat transfer with the cooling air blown by said fan means to sense a failure condition of said fan means to blow cooling air through said air passageway, thereby to terminate heating in said oven cavity by interrupting power supply to said heating means upon occurrence of either of said conditions, and said indicating means including said time clock and said clock motor, said single limit switch in series electrical supply relationship with said clock motor, thereby to stop said time clock simultaneously with the interruption of power supply to said heating means.

* * * * *